United States Patent Office 3,250,253
Patented May 10, 1966

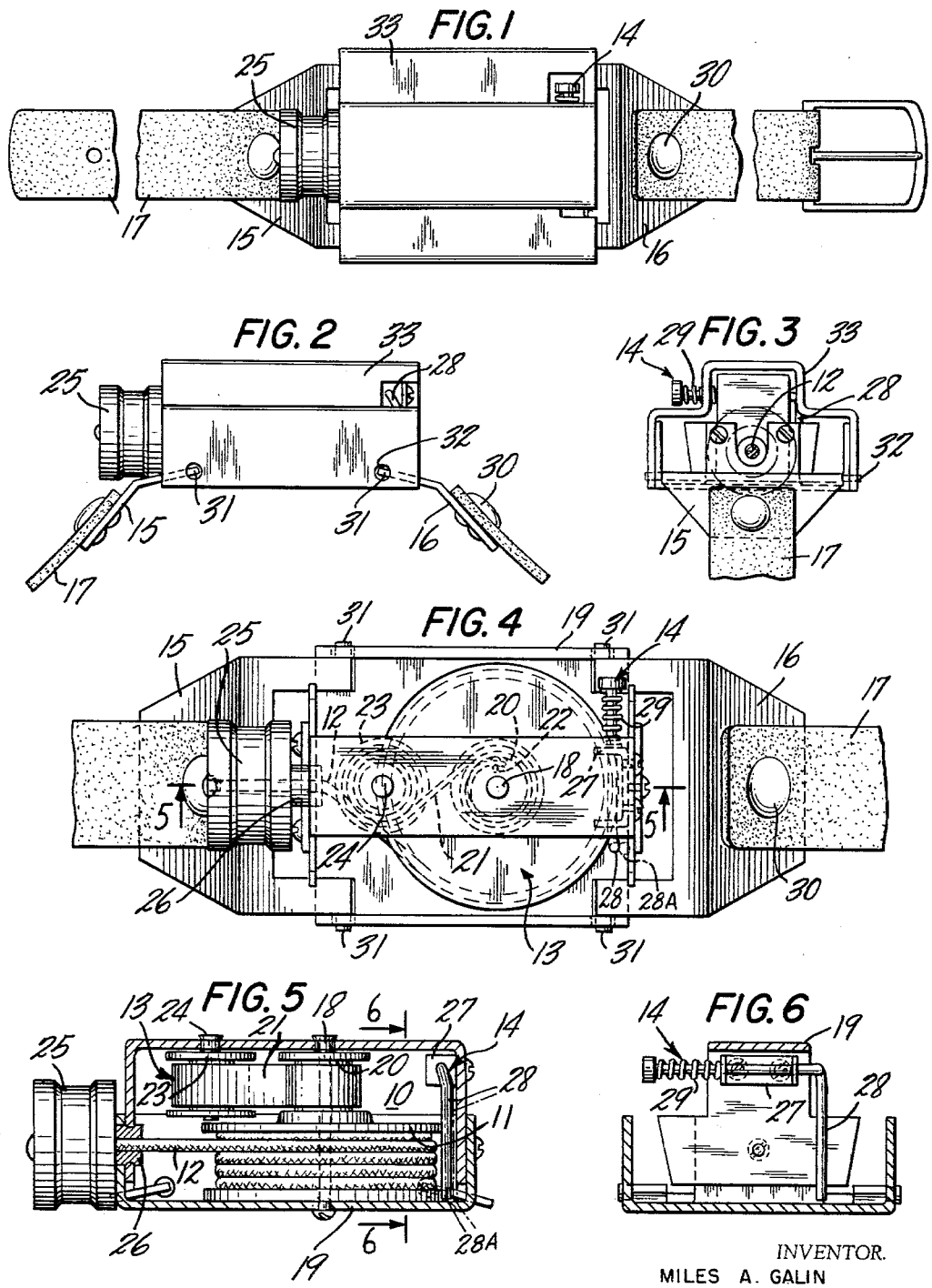

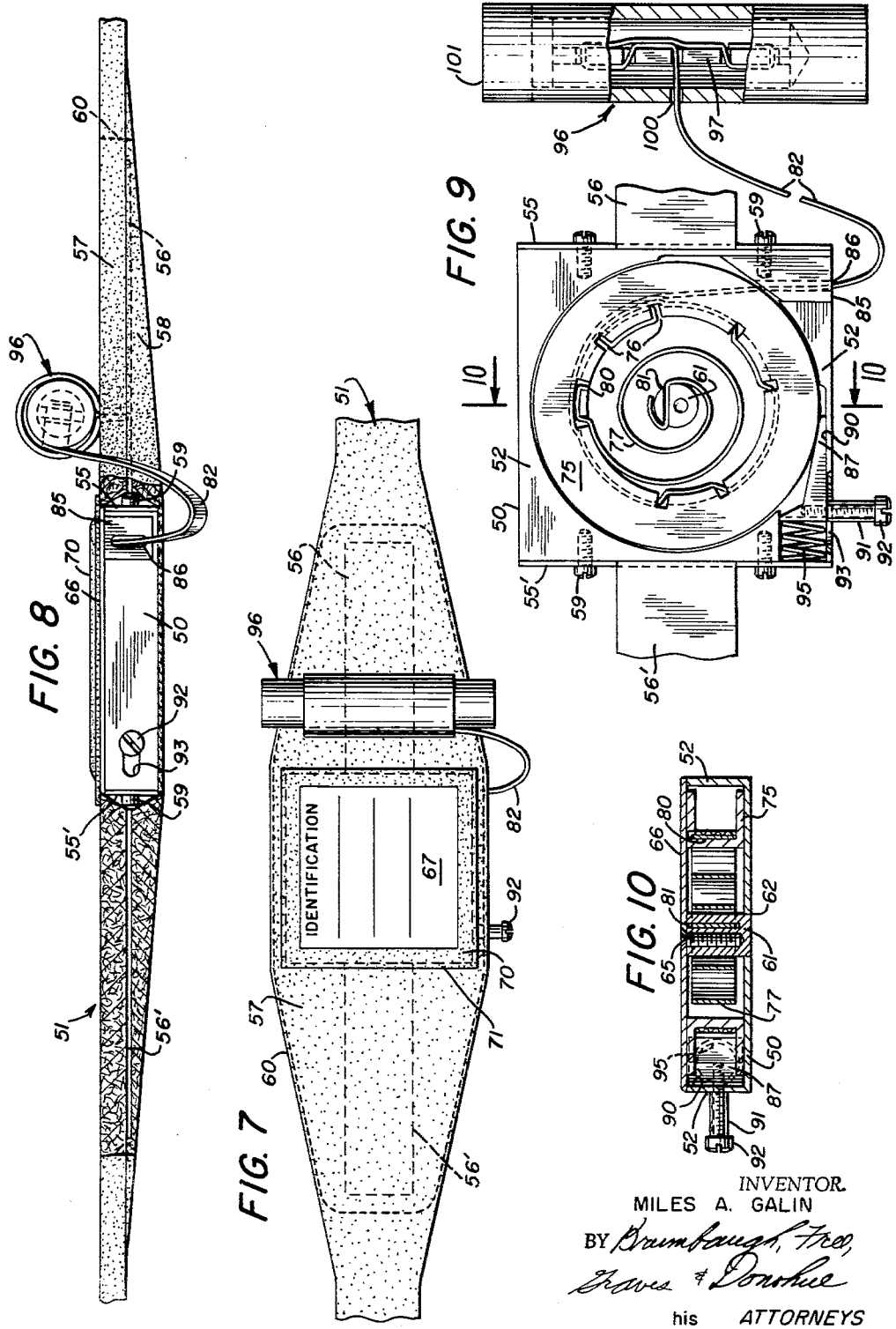

3,250,253
DOG COLLAR WITH RETRACTABLE LEASH
Miles A. Galin, Woodmere, N.Y., assignor to Theratronic Corp. of America, New York, N.Y., a corporation of New York
Filed Jan. 6, 1965, Ser. No. 425,111
12 Claims. (Cl. 119—109)

This application is a continuation-in-part of application Serial No. 263,972, filed March 8, 1963, now abandoned.

This invention relates to improvements in leashes for domestic animals and more particularly to an improved form of retractable leash for use with animal collars.

A retractable leash for use with a domestic animal, such as a dog, is useful for calming the animal in crowded or congested areas, for example, city streets and public conveyances. The noise, motion, and people commonly encountered in such places generally cause even well-trained and good-tempered animals to be nervous and uncontrollable. By providing a leash which can be quickly and conveniently shortened, the distance between the animal and the master can be readily decreased so the well-known calming influence exerted on the animal by the close proximity of the master can be exercised. This is of particular importance when the master's hands are otherwise occupied with parcels and the like, or when the master is blind.

Devices presently available use a conventional leash which may be selectively wound within, or released from, a drum affixed to the animal's collar. These devices, generally using spiral coiled springs, are unsatisfactory since the spring fails to apply a constant torque to the leash over the entire working range of leash lengths. Furthermore, the transmission of imposed loadings between the leash and the spring when the spring is fully unwound often causes the allowable spring working stress to be exceeded, resulting in a deformed or broken spring. Moreover, these leashes do not have satisfactory means for locking the leash at different extended lengths.

An object of this invention is to provide a collar having an integral spring-retractable leash with an improved braking mechanism.

Another object of this invention is to provide a retractable leash subject to a nearly uniform tension throughout the entire range of leash working lengths.

Another object of this invention is to provide a means for relieving the tension on the leash when it is extended to a desired length.

Another object of this invention is to provide a spring-driven retractable leash with an operating life of substantial length.

Still another object of this invention is to provide a retractable leash which can be wound into a compact unit to fit on an adjustable animal collar.

Other objects and advantages of the invention will be apparent during the course of the following description.

According to the present invention a compact spring motor may provide a uniform torque for driving a winding reel to which one end of a conventional leash has been affixed. By selecting a spring of sufficiently great length relative to the length of the leash at full extension, the spring may not be fully unwound to directly subject the extremities of the spring to loads in excess of the allowable spring working stress, thereby eliminating one of the most common causes of spring deformation and breakage.

A particular feature of the invention is the provision of a biased clutch urged into frictional engagement with the periphery of the winding reel and the casing to arrest the retraction of the leash by the motor. Moreover, a pair of plates pivoted to the retraction mechanism and fastened to the animal collar may provide a sufficient degree of adjustability for the collar and retraction mechanism to fit a range of animal neck sizes.

For a more complete understanding of the invention, reference may be had to the following detailed description taken in conjunction with the accompanying figures of the drawing, in which:

FIGURE 1 is a plan view of one exemplary embodiment of the invention;
FIGURE 2 is a side elevation of the embodiment of the invention shown in FIGURE 1;
FIGURE 3 is a front elevation of the embodiment of the invention illustrated in FIGURE 1 with the leash handle shown in phantom section;
FIGURE 4 is a plan view of the exemplary embodiment of the invention shown in FIGURE 1 with the retraction mechanism housing removed;
FIGURE 5 is a side elevation of the invention in full section taken along the plane represented by line 5—5 in FIGURE 4 and looking in the direction of the arrows;
FIGURE 6 is a front elevation of the invention in full section taken along the plane represented by line 6—6 in FIGURE 5 and looking in the direction of the arrows;
FIGURES 7 to 10, inclusive, illustrate an embodiment of the invention in which the wedging brake is used in cooperation with a retraction mechanism that has a single spool and a helical spring;
FIGURE 7 is a partial view of the assembly as seen from above;
FIGURE 8 is a side elevation with a portion of the edge of the collar broken away to reveal the inner structure;
FIGURE 9 shows the interior of the structure with the top plate removed, and the handle with a portion broken away to show its interior; and
FIGURE 10 is a partial sectional view taken on a vertical plane indicated by the line 10—10 in FIGURE 9 and looking in the direction of the arrows.

One embodiment of the invention, shown in FIGURE 5, has a winding mechanism 10 including a winding reel 11 to which one end of a conventional leash 12 is affixed. The winding reel 11, receiving the leash 12, is journaled on a shaft 18 fixed to a frame 19 which also supports a spring motor 13.

The spring motor 13 has a driven spool 20, also journaled to the shaft 18 and in fixed relationship with the winding reel 11. One end of a flat rate coil spring 21 is secured to the driven spool 20 by a screw 22 (FIGURE 4).

The other end of the flat rate spring 21 is coiled about a driving spool 23, journaled to a shaft 24 which has been fixed to the frame 19. The coiled flat rate spring 21 is secured to the driving spool 23 through the frictional forces applied by the coiled spring 21 to the shank portion of the driving spool 23.

The relative lengths of the leash 12 and the spring 21 are such that a substantial portion of the spring 21 is still wrapped about the shank portion of the driving spool 23 when the leash 12 is fully extended, thereby preventing the spring 21 from slipping off the driving spool 23. Moreover, the relative leash and spring lengths are such that when the leash 12 is fully wound on the winding reel 11, the terminal end of the coil spring 21, which is secured to the driven spool 20, is not subjected to direct tension from the driving spool 23 but is wrapped under several turns of coil spring 21.

A handle 25, conveniently shown in the form of a solid cylinder affixed to the free end of the leash 12, acts as a leash handle and as a stop to prevent the spring motor 13 from reeling the entire leash 12 onto the winding reel 11. A leash guide 26, fixed to the frame 19, engages the handle 25 when the leash 12 is fully retracted, thereby stopping further retraction.

A friction wedging clutch 14, slidably attached to the frame 19 by a bracket 27, has a downwardly depending arm 28, as seen in FIGURE 6, which is urged by a biasing spring 29 into frictional engagement with the periphery of the winding reel 11. As the depending arm 28 comes into contact with the periphery of the reel 11 near the center portion of the arm, it will be apparent that the reel will bear radially outwardly against the arm and force the lower end of the arm 28A into engagement with the frame 19 as shown in phantom in FIGS. 5 and 6. It will be apparent moreover that the arm 28 is aso in engagement with the frame 19 by way of the bracket 27 which is secured to the frame. Both the upper and lower portions of the arm 28 are therefore in sliding engagement with the frame 19. Hence, as the arm 28 moves tangentially into engagement with the reel 11 it wedges between the reel and the frame.

Plates 15 and 16 each have one end of a conventional dog collar 17 affixed thereto by rivets 30 or the like. The plates 15 and 16 are each provided with pairs of ears 31 projecting through complemental apertures 32 formed in the frame 19 and a housing 33 for the winding mechanism 10. The ears 31 are pivotally retained in the apertures 32 thereby providing a degree of free movement for the plates 15 and 16 enabling the collar 17 to be adjusted to fit a range of dog neck sizes. Moreover, the plates 15 and 16 have an arcuate shape, as shown in FIGURE 2, further enhancing the adaptability of the collar 17 to the generaly oval animal neck shape.

In operation, the leash is withdrawn from the winding mechanism 10 by depressing the friction clutch 14 to disengage the depending arm 28 from the periphery of the winding reel 11, thus freeing the winding reel 11 for rotation. The winding reel 11, having a substantially larger diameter than the driving spool 23, offers a materially greater mechanical advantage to the biasing spring 29 than is available to the coiled spring 21. Consequently, the biasing spring 29 may be a weak spring relative to the coiled spring 21, thereby requiring the application of only slight manual pressure to selectively free the winding reel 11 for rotation.

The leash 12 is unreeled from the winding reel 11 to a desired length by exerting a force on the leash 12 sufficient to overcome the torque applied by the coiled spring 21 and the driving spool 23 to the driven spool 20. Consequently, as the leash 12 is drawn from the winding reel 11, the spring 21 is wound on the driven spool 20. Releasing the friction clutch re-engages the depending arm 28 with the periphery of the winding reel 11 substantially stopping the leash 12 from any further extension.

To retract the leash 12, the friction clutch 14 is depressed in the manner hereinbefore described, releasing the winding reel 11 to rotate under the torque applied by the spring 21 and the driving spool 23 to the driven spool 20, rewinding the spring 21 back on the driving spool 23. The extra turns of spring 21 on the driven spool 20 prevent the non-uniform torque characteristics of the spring end from changing the tension on the leash 12, as well as prevent the weakened portion of the spring 21 at the screw 22 from being subjected to frequent flexing under tension.

When the leash 12 has been sufficiently retracted within the winding mechanism 10 the friction clutch 14 is released to re-engage the winding reel 11 and prevent further winding spool rotation. The leash guide 26, by engaging the handle 25 when the leash 12 is fully retracted will prevent the leash 12 from being completely drawn within the winding mechanism 10. The leash guide 26, moreover, prevents knots or kinks from developing in the leash 12 during retraction and withdrawal of the leash 12 from the winding reel 11.

The embodiment of the invention shown in FIGURES 7 to 10, which has the particular advantage of compactness, includes the case 50 enclosed within the collar 51. The body of the case includes a shell 52 suitably formed of brass or molded plastic having on opposite lateral edge plates 55 and 55' each with a side strap 56 and 56' respectively which projects into the collar 51 thereby to stabilize the positioning of the case 50. The outer and inner portions 57 and 58 of the collar are sewed together at 60 thereby securely to fasten the case and the projecting side straps within the collar. The plates 55 and 55' are securely fastened to the shell 52 by the screws 59.

A spring holder post 61 is secured to the case 50 suitably by soldering at 62 and is tapped to accommodate a screw 65 which serves to secure the cover plate 66 to the case 50. The cover 66 is also suitably overlaid with an identification card 67 which is held in place by an overlying frame-shaped portion of leather 70 sewed to the collar at 71.

Within the circular opening in the shell 52 there is positioned a reel or spool 75 having a slotted inner periphery as shown at 76. A helical spring 77 is secured at one end 80 in these slots and at its other end it is secured in the vertical slot 81 in the post 61.

A leash 82 is wound around the spool 75 and secured thereto by being wound in and out through the slots 76. A nylon guide 85 is shaped so as to fit inside the shell 52 secured by one of the screws 59. The guide has an opening 86 adapted to accommodate the leash 82.

A wedge-shaped brake 87 slides within the case 50 in a channel 90 and is provided with a handle 91 secured to the brake by a screw 92. The brake is normally urged into wedging engagement between the reel 75 and the case 50 by a helical spring 95 which bears against the plate 55'. The handle projects through the slot-shaped opening 93 in the case 50.

The handle, indicated generally at 96, is hollow and has within its interior a notched plate 97. The leash 82 enters the handle 96 through an opening 100 and is secured to the handle by being wound back and forth through the notches in the plate 97. The open end of the handle is closed by a handle cover 101 which may be secured to the handle in any desired manner, such as a tight friction fit or by gluing.

To operate the device when it is desired to make the leash longer, the handle 91 is pushed backwardly away from the periphery of the reel 75 whereupon the leash 82 is pulled outwardly against the force exerted by the helical spring 77. When a desired length of leash has been exposed, the handle 91 is released whereupon the helical spring 95 reseats the brake 87 in wedging position between the case 50 and the periphery of the reel 75. When it is desired to shorten the leash, the brake 87 is similarly released whereupon the spring 77 causes the reel 75 to rotate and the leash 82 to be wound around the spool until the brake is again reseated. It will be observed that pulling of the leash causes the brake 87 to seat itself more firmly, thereby providing a secure hold on the animal.

As is apparent from the foregoing, the present invention provides an apparatus for a simple, durable and easily controlled retractable leash.

While a representative embodiment of the present invention has been shown and described for purposes of illustration, various changes and modifications may be made therein as pointed out above without departing from the principles of this invention. Therefore, all such changes and modifications are included within the intended scope of the invention as defined by the following claims.

I claim:

1. A retractable leash for use with a dog collar comprising a frame attached to the dog collar, a reel rotatably mounted on said frame for winding said leash, a leash wound around said reel, a first spool in driving relationship with said reel and rotatable therewith, a second spool mounted for rotation on said frame, spring means wound around said spools to wind from one spool to the other as the leash is being withdrawn and to return to said one spool as the leash is retracted, thereby to exert a generally uniform turning moment on said reel, and a brake member releasably spring biased in wedging engagement between the periphery of said reel and said frame and adapted to move in a direction substantially tangential to said reel.

2. A retractable leash for use with a dog collar comprising a frame attached to the dog collar, a reel rotatably mounted on said frame for winding said leash, a leash wound around said reel, a first spool mounted on the same axis as the reel and rotatable therewith, a second spool mounted for rotation on said frame on an axis separate from said first spool and reel, spring means wound around said spools to wind from one spool to the other as the leash is being withdrawn and to return to said one spool as the leash is retracted, thereby to exert a generally uniform turning moment on said reel, and a brake member releasably spring biased in wedging engagement between the periphery of said reel and said frame and adapted to move in a direction substantially tangential to said reel.

3. A retractable leash for use with a dog collar, comprising a frame attached to the dog collar, a reel rotatably mounted on said frame for winding said leash, a spool mounted on the same axis as the reel and in driving relationship therewith, spring means selectively wound around said spool and adapted to drive said reel, and a brake member releasably spring biased in wedging engagement between the periphery of said reel and said frame and adapted to move in a direction substantially tangential to said reel.

4. A retractable leash for use with a dog collar comprising a frame attached to the dog collar, a reel rotatably mounted on said frame for winding said leash, a leash wound around said reel, a first spool mounted on the same axis as the reel and rotatable therewith, a second spool mounted for rotation on said frame on an axis separate from said first spool and reel, spring means wound around said spools to wind from one spool to the other as the leash is being withdrawn and to return to said one spool as the leash is retracted and clutch means for selectively stopping said reel rotation, thereby to selectively exert a generally uniform turning moment on said reel.

5. A retractable leash for use with a dog collar comprising a frame attached to the dog collar, a reel rotatably mounted on said frame for winding said leash, a leash wound around said reel, a first spool mounted on the same axis as the reel and rotatable therewith, a second spool mounted for rotation on said frame on an axis separate from said first spool and reel, spring means wound around said spools to wind from one spool to the other as the leash is being withdrawn and to return to said one spool as the leash is retracted and a biased friction clutch in selective frictional engagement with the periphery of said reel, thereby to selectively exert a generally uniform turning moment on said reel.

6. A retractable leash for use with an animal collar comprising a frame attached to the dog collar having a guide thereon limiting the retraction of the leash, a reel rotatably mounted on said frame for winding the leash, a first spool mounted on the same axis as the reel and rotatable therewith, a second spool mounted for rotation on said frame on an axis separate from said first spool and reel, spring means wound around said spools to wind from one spool to the other as the leash is being withdrawn and to return to said one spool as the leash is retracted and a biased friction clutch in selective frictional engagement with the periphery of said reel, thereby to selectively exert a generally uniform turning moment on said reel.

7. A retractable leash for use with a dog collar comprising a frame, a pair of plates having the collar attached thereto, each of said plates being pivoted to an extremity of said frame for adjustable attachment of the collar therewith, a stop on said frame limiting the retraction of the leash, handle means on the leash for engaging said stop, a reel rotatably mounted on said frame for winding said leash, a first spool mounted on the same axis as the reel and rotatable therewith, a second spool mounted for rotation on said frame on an axis separate from said first spool and reel, spring means wound around said spools to wind from one spool to the other as the leash is being withdrawn and to return to said one spool as the leash is retracted and a biased friction clutch selectively urged against the periphery of said reel, thereby to selectively exert a generally uniform turning moment on said reel.

8. A retractable leash for use with a dog collar comprising a frame, a pair of plates each attached to an end of the collar, each of said plates being pivoted to an extremity of said frame for adjustable attachment of the collar therewith, guide means on said frame receiving the leash for passage therethrough, handle means on the leash for selective engagement with said guide means limiting the retraction of the leash, a reel rotatably mounted on said frame for winding said leash, a first spool mounted on the same axis as the reel and rotatable therewith, a second spool mounted for rotation on said frame on an axis separate from said first spool and reel, spring means wound around said spools to wind from one spool to the other as the leash is being withdrawn and to return to said one spool as the leash is retracted and a biased friction clutch selectively urged against the periphery of said reel, thereby to selectively exert a generally uniform turning moment on said reel.

9. A retractable leash as described in claim 4 in which said clutch means is a brake member releasably spring biased in wedging engagement between the periphery of said reel and said frame and adapted to move in a direction substantially tangential to said reel.

10. A retractable leash for use with a dog collar, comprising a frame attached to the dog collar, a reel rotatably mounted in said frame for winding said leash, a spring mounted on said frame and in driving relationship with said reel and a brake member releasably spring biased in wedging engagement between the periphery of said reel and said frame and adapted to move in a direction substantially tangential to said reel.

11. A retractable leash as described in claim 10 in which said reel has a hollow center and said spring is a helical spring secured at one end to the inner periphery of said reel and at the other end to said frame.

12. A retractable leash as described in claim 10 in which said brake member has affixed thereto a projection projecting beyond the exterior of said frame to facilitiate the release of said brake member.

References Cited by the Examiner
UNITED STATES PATENTS 2,222,409 11/1940 Gottlieb _____ 242—107.3
2,889,807 6/1959 Beebe _____ 119—109

MELVIN D. REIN, *Primary Examiner.*

HUGH R. CHAMBLEE, *Examiner.*